United States Patent [19]
Watanabe et al.

[11] 3,899,572
[45] Aug. 12, 1975

[54] PROCESS FOR PRODUCING PHOSPHIDES

[75] Inventors: Naozo Watanabe; Kenji Morizane; Masaaki Ayabe, all of Tokyo, Japan

[73] Assignee: Sony Corporation, Tokyo, Japan

[22] Filed: July 19, 1972

[21] Appl. No.: 273,297

Related U.S. Application Data

[63] Continuation-in-part of Ser. No. 96,030, Dec. 8, 1970.

[30] Foreign Application Priority Data

Dec. 13, 1969 Japan.............................. 44-100301
Dec. 13, 1969 Japan.............................. 44-100303
Dec. 13, 1969 Japan.............................. 44-100304
Dec. 13, 1969 Japan.............................. 44-100305

[52] U.S. Cl.......................... 423/299; 252/62.36 A
[51] Int. Cl.............................................. C01b 25/00
[58] Field of Search............... 423/299; 252/62.36 A

[56] References Cited
UNITED STATES PATENTS

| | | | |
|---|---|---|---|
| 2,862,787 | 12/1958 | Seguin et al. .................. | 423/299 X |
| 2,937,075 | 5/1960 | Weiser................................ | 423/299 |
| 3,077,384 | 2/1963 | Enk et al. ....................... | 423/299 X |
| 3,218,205 | 11/1965 | Ruehrwein........................ | 423/299 |
| 3,366,454 | 1/1968 | Folberth et al. .................. | 423/299 |
| 3,615,203 | 10/1971 | Kaneko et al..................... | 423/299 |

FOREIGN PATENTS OR APPLICATIONS

1,106,745   3/1968   United Kingdom

*Primary Examiner*—Oscar R. Vertiz
*Assistant Examiner*—Gregory A. Heller
*Attorney, Agent, or Firm*—Hill, Gross, Simpson, Van Santen, Steadman, Chiara & Simpson

[57] ABSTRACT

A process for producing a select phosphide, such as gallium, indium or aluminum phosphide comprising; positioning a gaseous phosphorus-source material, such as red phosphorus and a select phosphide-forming source material, such as a Group III element, in a reaction zone; introducing an inert gas, such as nitrogen, into the reaction zone at a pressure above the decomposition pressure of the selected phosphide at a given temperature; heating the gaseous phosphorus-source material to provide a gaseous phosphorus atmosphere within the reaction zone at a pressure at least equal to the pressure of the inert gas; heating said phosphide-forming material to a temperature sufficient for it to react with gaseous phosphorus; cooling an upper portion of the reaction zone to a temperature sufficient to convert gaseous phosphorus to liquid phosphorus; and maintaining the temperature-pressure conditions within the reaction zone for a period of time sufficient for the gaseous phosphorus to react with the heated phosphide-forming material within the reaction zone and form the select phosphide.

12 Claims, 9 Drawing Figures

PROCESS FOR PRODUCING PHOSPHIDES

CROSS-REFERENCE TO RELATED APPLICATION

This is a continuation-in-part of U.S. Ser. No. 96,030, filed Dec. 8, 1970 and which is incorporated herein by reference.

BACKGROUND OF THE INVENTION

1. Field of the Invention

The invention relates to a process for producing phosphides and more particularly to a process for synthesizing phosphide semiconductors such as gallium phosphide, indium phosphide, aluminum phosphide and the like as well as to a process for producing such phosphide monocrystals.

2. Description of the Prior Art

Phosphide semiconductors such as for example gallium phosphide, indium phosphide, aluminum phosphide, etc. attract attention as materials for luminescent diodes because they have relatively large energy band gaps as compared with other III-V Group compound semiconductors and they readily form P- or N-type semiconductors. However, the manufacture of these phosphides involves many difficulties which impose severe limitations on their availability. For example, such phosphides have high melting points and dissociate at various pressures below their respective melting points, so tha that the more volatile component thereof vaporizes to decompose the phosphide compound and thus makes it impossible to provide a desired phosphide.

Prior art methods of synthesizing such phosphides and producing monocrystals thereof are known and for the sake of simplicity, prior art processes of synthesizing one of such phosphides, for example, gallium phosphide, will be described. In a first prior art process, an amount of gallium is positioned in a boat or crucible of boron nitride and disposed in a furnace means. A gas stream containing hydrogen phosphide ($PH_3$) in a carrier gas of hydrogen ($H_2$) is directed over the gallium within the boat. The gallium is heated up to about 1000° C. and one end of the boat is maintained at a temperature lower than the other end by about 100° C. so that gallium phosphide is synthesized at the cooler end of the boat.

In a second prior art process, an amount of red phosphorus is disposed in a first graphite vessel and an amount of gallium is disposed in a second graphite vessel somewhat remote fromthe first graphite vessel, with both graphite vessels being sealed in a quartz tube. The red phosphorus is then subjected to a temperature of about 510° C. so as to provide an atmosphere of gaseous phosphorus in the tube while the gallium is subjected to a temperature exceeding 1400° C. to provide molten gallium. The gaseous phosphorus reacts with the molten gallium and synthesizes gallium phosphide (GaP). However, such known prior art methods have drawbacks, for example, there is difficulty in controlling the vapor pressure of phosphorus within the reaction zone and the necessary apparatus is of a complex construction.

A third prior art process is generally referred to as a solution growth technique for monocrystalline production. In this process, gallium phosphide or phosphorus is added to gallium in an amount of 1:10 of the former, and the resultant mixture is enclosed in a sealed vacuum tube and heated up to approximately 1100° C. so as to produce a gallium solution that is substantially saturated with gallium phosphide. Such a gallium solution is gradually cooled so as to permit the growth of a monocrystal of gallium phosphide therein. While this method is extremely simple, it is not sufficiently reproducible to be practical.

A fourth prior art process is generally referred to as a vapor growth technique. In this process, a boat is provided with an amount of a monocrystalline substrate composed of, for example, gallium arsenide and another boat is provided with an amount of gallium. The two boats are disposed in a suitable furnace means and a gas stream containing phosphorus chloride $PCL_3$) in a carrier gas composed of hydrogen ($H_2$) is directed over the boats while the furnace is being heated up above the melting point of gallium. The resultant gallium chloride and phosphorus react with each other so that epitaxial growth of gallium phosphide on the substrate takes place. This process is practiced with various modifications according to the gases that are utilized, but in any case, high growth speed is not attainable.

A fifth method, which is commonly referred to as a liquid encapsulation method, has recently been developed for pulling a monocrystal of, for example, gallium phosphide. In this method, monocrystalline pulling is achieved by covering the surface of molten polycrystalline gallium phosphide with low vapor pressure boron trioxide to prevent the evaporation of phosphorus. However, this method is disadvantageous in that it requires the necessity of providing a previously synthesized polycrystalline gallium phosphide, is incapable of preventing contamination of the desired product with boron, has excessive losses of phosphorus by evaporation, etc.

SUMMARY OF THE INVENTION

The invention utilizes particular allotropic properties of phosphorus to produce desired phosphides. In its broader principles, the invention comprises a process of producing phosphides involving the establishment of a pressure equilibrium between gaseous phosphorus and an inert gas within a reaction zone so that an upper portion of the reaction zone is composed of the inert gas and a lower portion is composed of gaseous phosphorus. A select phosphide-forming material is placed within such lower portion of the reaction zone and heated to a temperature sufficient to react with the gaseous phosphorus and form the desired phosphide. In this manner, synthesis and the growth of monocrystals of desired phosphide semiconductors is readily achieved under highly controllable operating conditions so that excellent quality phosphides are produced.

In one embodiment of the invention, a gaseous phosphorus-source material, such as red phosphorus or liquid phosphorus in a stable phase, is positioned along a botton portion of an enclosed reaction zone and a select phosphide-forming material, such as a Group III element or a mixture of a Group III element and a select phosphide is positioned along the bottom portion of the reaction zone remote from the gaseous phosphorus-source material and below an upper portion of the enclosed reaction zone. An inert gas, such as nitrogen, argon, neon, etc. is fed to the enclosed reaction zone at a pressure at least equal to the decomposition pressure of the select phosphide at a given temperature. The phosphide-forming material is heated to a temperature sufficient for the phosphide-forming material to react with gaseous phosphorus and the gaseous phosphorus-source material is heated to a temperature sufficient to vaporize at least a portion thereof so as to form gaseous phosphorus at a pressure about equal to the pressure inert gas. Temperature-pressure equilibrium conditions are established within the reaction zone so that the upper portion thereof is composed of the inert gas while the lower portion thereof is composed of gaseous phosphorus. A preferred means of establishing such conditions involves maintaining the pressure of the inert gas at the selected value while lowering the temperature of the upper portion of the reaction zone sufficiently to convert gaseous phosphorus to liquid phosphorus. During such equilibrium conditions contact is established between the heated phosphide-forming material and gaseous phosphorus and the select phosphide is produced.

In an exemplary embodiment of the invention for the production of gallium phosphide, a gaseous phosphorus-source material and a gallium phosphide-forming material are properly positioned with a lower portion of an enclosed reaction zone. An inert gas is fed into the reaction zone at a pressure above 34 atm., since the decomposition pressure of gallium phosphide is 35 atm. at its melting point of 1470° C. At other given temperatures, gallium phosphide has other decomposition pressures, for example, at 1380° C. the decomposition pressure is about 1 atm. and at 1300° C. the decomposition pressure is about 0.2 atm. The gaseous phosphorus-source material is heated up to at least a temperature sufficient to form gaseous phosphorus at a pressure about equal to the pressure of inert gas, i.e. about 600° C. The phosphide-forming material is heated up to a given temperature sufficient for reaction with gaseous phosphorus in forming phosphides. The reaction rate is dependent upon such given temperature and is thus selected as high as possible in view of the limits of the reaction zone, i.e. not exceeding the heat-pressure limits of an apparatus enclosing the reaction zone. In an exemplary embodiment, the phosphide-forming material is heated up to at least the melting point of gallium phosphide, i.e. about 1500° C. The upper portion of the reaction zone is cooled to a temperature in a range of about 44° to 250° C., so that nay gaseous phosphorus coming into contact with the cooled upper portion of the reaction zone is converted to liquid phosphorus. A temperature-pressure equilibrium between the inert gas and gaseous phosphorus is thus established within the reaction zone so that gaseous phosphorus contacts molten gallium phosphide-forming material and produces gallium phosphide. The so-formed gallium phosphide does not decompose under the reaction conditions and readily reproducible yields are obtained.

Other embodiments of the invention include production of monocrystals of select phosphides, either by an in-solution growth or by a pulling technique. Apparatus for practicing the principles of the invention are also described.

DESCRIPTION OF THE PREFERRED EMBODIMENTS

Phosphorus exists in two allotropic forms at room temperature and standard atmospheric pressures, i.e. as yellow phosphorus and as red phosphorus. In comparison to the yellow phosphorus, red phosphorus is chemically stable. Yellow phosphorus has a melting point of about 44° C. and spontaneously ignites in air. Yellow phosphorus and liquid phosphorus are in a metastable phase that solidifies, and when heated up to about 250° C. or irradiated by ultraviolet rays form red phosphorus. However, yellow phosphorus and liquid phosphorus remain in the metastable condition for a prolonged period of time unless heated or irradiated by ultraviolet rays.

Figure 1:
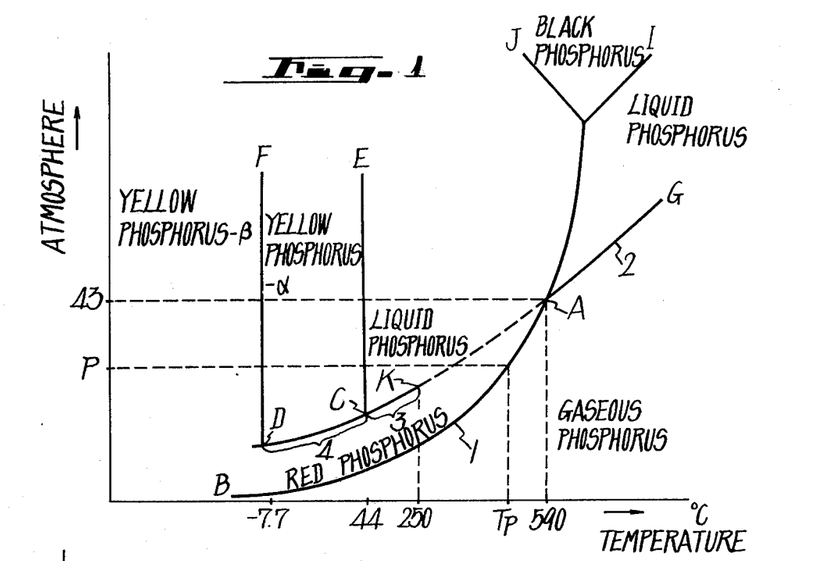
FIGS. 1 and 2 are phase diagrams of phosphorus in relation to pressure and temperature utilized in explaining certain principles of the invention.

FIG. 1 illustrates a phase diagram of phosphorus showing the phase relation between red phosphorus, yellow phosphorus and liquid phosphorus in regard to pressure and temperature conditions. Curve 1 interconnects points A and B and illustrates the vapor pressure of red phosphorus. As is apparent from curve 1, at a pressure below about 43 atm, and at a temperature below about 590° C., the stable phase of phosphorus is red phosphorus. Curve 2 joins points G and A and represents the vapor pressure of phosphorus from the liquid to the gaseous phase. A portion 3 of curve 2 illustrates the metastable liquid phase. A portion 4 of curve 2 illustrates the solid phase of yellow phosphorus which exists at the lower temperature range of curve 2. At standard pressure conditions, yellow phosphorus in its solid phase melts at about 44° C. and forms liquid phosphorus, which is relatively stable under these pressure-temperature conditions. However, when liquid phosphorus is heated up to a temperature above about 250° C., it rapidly changes into red phosphorus. As illustrated at FIG. 1, yellow phosphorus exists in a liquid form in the temperature range between points C and K and in a solid form at temperatures below point C. In the temperature range between points A and K, yellow phosphorus becomes liquid and quickly solidifies into red phosphorus. The speed at which liquid phosphorus forms red phosphorus increases proportional to the increase in temperature, i.e. the inversion speed increases as the temperature approaches point A.

Figure 2:
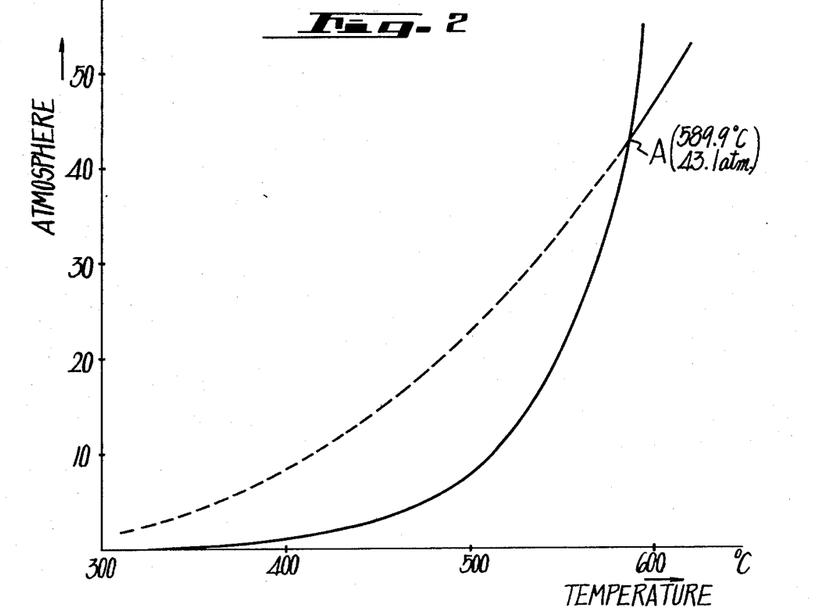

FIG. 2 is an enlarged view of a portion of the phase diagram illustrated at FIG. 1 and shows the phosphorus phases in a temperature range utilized in accordance with the principles of the invention.

The invention provides a method of utilizing particular allotropic properties of phosphorus to produce desired phosphide semiconductors composed of Group III-phosphorus compounds. By proper application of pressure-temperature conditions to select reactants in an enclosed reaction zone, the invention provides a readily controllable and simple process for the synthesis of such phosphides and the growth of their monocrystals. The pressure-temperature conditions are selected so as to establish a pressure equilibrium between gaseous phosphorus and an inert gas within a reaction zone so that an upper portion of the zone is composed of an inert gas and a lower portion of the zone is composed of gaseous phosphorus. A preferred means of establishing such equilibrium conditions includes maintaining the pressure of the inert gas within the reaction zone at the select value while cooling the temperature of the upper portion of the reaction zone to below the inversion temperature of liquid phosphorus into red phosphorus. A phosphide-forming material is placed within the lower portion of the reaction zone in contact with the gaseous phosphorus and sufficiently heated to react therewith and form the desired phosphide.

In a first embodiment of the invention, a suitable gaseous phosphorus-source material, such a red phosphorus or liquidd phosphorus in the stable phase and a select phosphide-forming material, such as a Group III element, for example, gallium, indium or aluminum or a mixture of such an element and the select phosphide (such as a preformed polycrystalline form thereof) are positioned in a portion of a reaction zone. An inert gas such as hydrogen, nitrogen, argon, neon, etc. is fed into the reaction zone at a pressure at least equal to the decomposition pressure of the select phosphide at a given temperature. The temperature of the reaction zone is raised at least sufficiently so as to form gaseous phosphorus at a pressure about equal to the pressure of the inert gas within the reaction zone. The upper portion of the reaction zone is cooled to a temperature below the inversion temperature of liquid phosphorus into red phosphorus. Any excess gaseous phosphorus is thus condensed and a pressure equilibrium between the inert gas and gaseous phosphide is thus attained within the reaction zone. Under such equilibrium conditions a portion of such reaction zone is formed of gaseous phosphorus and anothe portion is composed of the inert gas. The phosphide-forming material is within the gaseous phosphorus portion of the reaction zone and in contact therewith. The temperature-pressure equilibrium conditions within the reaction zone are maintained for a period of time sufficient for the gaseous phosphorus to react with the heat-treated phosphide-forming material and form the select phosphide.

In one specific form of this embodiment of the invention, a suitable gaseous phosphorus-source material and a suitable phosphide-forming material are positioned within an enclosed reaction zone at locations somewhat remote from each other. An inert gas is fed into the enclosed reaction zone at a pressure equal to the decomposition pressure of the desired phosphide at its melting point. The temperature of an upper portion of such reaction zone is maintained above the melting point of yellow phosphorus (i.e., at 1 atm. about 44°C., at 50 atm. about 46°C., etc.) and below the inversion temperature of liquid phosphorus to red phosphorus (i.e., about 250°C.). Substantially simultaneously the temperature of the lower portion of the reaction zone is maintained above a temperature at which the vapor pressure of gaseous phosphorus is equal to the pressure of the inert gas with the reaction zone. In this manner, the gaseous phosphorus-source material vaporizes and provides a gaseous atmosphere within the lower portion of the reaction zone and when the gaseous phosphorus contacts the upper, cool portion of the reaction zone, it solidifies into liquid phosphorus and gravitates to the lower, heated portion of the reaction zone for revaporization. Of course, the phosphide-forming material is in the meanwhile heated sufficiently to react with gaseous phosphorus and form the desired phosphide. These presure-temperature conditions are maintained over a period of time sufficient to form the desired phosphide.

If desired, the temperature of the upper portion of the reaction zone can be raised to about 250°C. so that the phosphorus gradually solidifies into red phosphorus along such upper portion and is removed from the reaction zone.

In a modification of this embodiment, a mixed crystal phosphide is produced by placing two or more desired phosphide-forming materials within the reaction zone and proceeding as set forth above. For example, an aluminum phosphide-forming material and a gallium phosphide-forming material are positioned within the reaction zone and the proper pressure-temperature conditions established to yield a mixed crystal of aluminum phosphide and gallium phosphide.

Another embodiment of the invention is especially useful for the synthesis of a monocrystal of a select phosphide. This embodiment of the invention also includes properly positioning a gaseous phosphorus-source material and a select phosphide-forming material within the reaction zone, feeding an inert gas into such zone at a pressure higher than the decomposition pressure of the select phosphide at a given temperature and maintaining a select temperature in upper and lower portions of the reaction zone as described in conjunction with the first embodiment. In addition, the phosphide-forming material is heated up to at least its melting point so as to form a molten mass thereof and then heated sufficiently to establish a temperature gradient in such molten mass, with a lower portion thereof being at a lower temperature than an upper portion thereof. For example, in forming a gallium phosphide from gallium, an upper portion of the gallium is maintained at about 1400°C. while a lower portion thereof is maintained at about 1300°C. The temperature gradient within the molten phosphide-forming material ranges from about 30°C. to 300°C. The upper temperature is maintained generally below the melting point of the select phosphide being synthesized. Of course, substantially simultaneously with the establishment of the temperature gradient in the phosphide-forming material, the temperature of at least the lower portion of the reaction zone is maintained at least lower than the temperature at which the pressure of gaseous phosphorus equals the decomposition pressure of the select phosphide. Thus, when the higher temperature molten phosphide-forming material comes in contact with the gaseous phosphorus, synthesis of the select phosphide occurs and since the solubility of the phosphide in a molten phosphide-forming material is lower at lower temperatures, the synthesized phosphide migrates downwardly to the lower temperature portion of the molten phosphide-forming material and precipitates thereat as a monocrystal of the select phosphide.

A further embodiment of the invention involves production of a select phosphide in accordance with the Bridgeman technique. This embodiment involves positioning a suitable gaseous phosphorus-source material and a select phosphide-forming material with a lower portion of an enclosed reaction zone, feeding an inert gas to such reaction zone at a pressure about equal to the decomposition pressure of the select phosphide at its melting point, and establishing pressure-temperature conditions between the inert gas and gaseous phosphorus so that an upper portion of the reaction zone is composed of inert gas and a lower portion is composed of gaseous phosphorus. The temperature of the phosphide-forming material is selectively raised up to at least the melting point of the select phosphide while simultaneously the temperature of at least the lower portion of the reaction zone is raised to at least a temperature at which the vapor pressure of gaseous phosphorus is equal to the decomposition pressure of the select phosphide at its melting point.

For example, when it is desired to produce a gallium phosphide in accordance with this embodiment, it is knwon that gallium phosphide has a decomposition pressure of 35 atm. at its melting point of 1470° C. Accordingly, the pressure of an inert gas within a reaction zone is maintained above 35 atm. The temperature of the lower portion of the reaction zone is maintained above about 580° C., for example, at 600° C. so that the pressure of gaseous phosphorus within the reaction zone is at least equal to 35 atm. Any excess pressure of gaseous phosphorus is removed by maintaining the upper portion of the reaction zone at a temperature below the inversion temperature of liquid phosphorus into red phosphorus. The phosphide-forming material is heated above the melting point of gallium phosphide (1470° C.), for example, up to 1500° C. Similarly, when it is desired to produce an indium phosphide whose decomposition pressure is 21 atm. at its melting point of 1060° C., the pressure of the inert gas is maintained above 21 atm., the temperature of the lower portion of the reaction zone is maintained at about 600° C. while the temperature of the upper portion thereof is maintained below about 250° C. and the select phosphide-forming material is heated above the melting point of indium phosphide, for example, up to 1100° C.

After the phosphide-forming material is melted, it reacts with the gaseous phosphorus and forms the select phosphide. The melt of the phosphide is lowered downwardly into a cooler area of the reaction zone and a single crystal of the select phosphide forms in a lower portion of such melt. Since the pressure of gaseous phosphorus within the reaction zone in maintained at a constant value above the decomposition pressure of the select phosphide being synthesized, the phosphorus thereof cannot vaporize to decompose the phosphide, thus insuring the easy and complete growth of a monocrystal of the select phosphide.

A further embodiment of the invention involves production of a select phosphide in accordance with a crystal pulling technique. This embodiment involves positioning a suitable gaseous phosphorus-source material within a lower portion of an enclosed reaction zone and positioning a select phosphide-forming material within the lower portion of the reaction zone and above the gaseous phosphorus-source material, feeding an inert gas into the reaction zone at a pressure above the decomposition pressure of the select phosphide at its melting point and establishing pressure-temperature conditions within the reaction zone so that equilibrium conditions between the inert gas and the gaseous phosphorus are achieved and the upper portion of the reaction zone is composed of inert gas while the lower portion thereof is composed of gaseous phosphorus. The phosphide-forming material is heated up to at least its melting point so as to form a molten mass in contact with the gaseous phosphorus and thereby react with such phosphorus to form the selected phosphide. A suitable seed crystal is moved into contact with the surface of the molten mass and then controllably pulled away from the molten mass so that a desired monocrystal of the select phosphide attaches to the seed crystal and is pulled from the molten mass.

The invention is practiced with specialized apparatus, exemplary forms of which are illustrated in FIGS. 3, 5, 6, 8 and 9.

Figure 3:
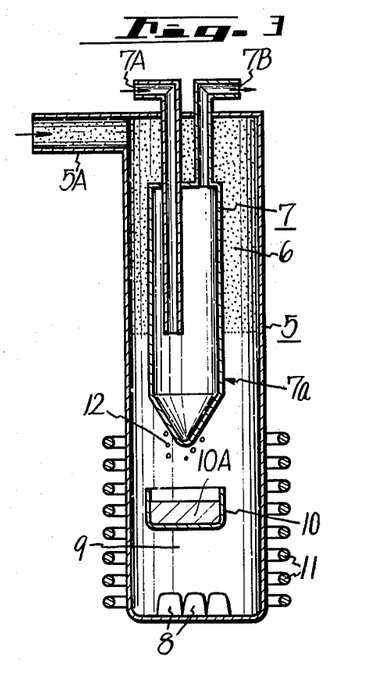
FIG. 3 is a schematic cross-sectional view showing one embodiment of an apparatus useful in practicing the principles of the invention.

The apparatus illustrated at FIG. 3 comprises a reaction housing 5 defining an enclosed reaction zone 9. The housing 5 is composed of, for example, quartz. A conduit 5A is provided along the upper portion of housing 5 for evacuating the interior thereof and feeding an inert gas 6, such as argon, neon, nitrogen, etc., into the reaction zone 9. A heat-exchange means, such as condenser 7, is positioned within the upper portion of the reaction zone 9 so as to have a heat-exchange surface 7a within an upper portion of zone 9. The condenser 7 has an inlet conduit 7A and an outlet conduit 7B for circulating a heat-exchange medium, such as a liquid or a gas, through the condenser 7 to provide a select temperature to the heat-exchange surface 7a thereof and thus to the upper portion of the reaction zone. A suitable gaseous phosphorus-source material 8, such as red phosphorus or liquid phosphorus in a stable phase is positioned within the lower portion of reaction zone 9. A crucible 10 is positioned within the lower portion of reaction zone 9 and somewhat above the material 8. A select phosphide-forming material 10A is placed within the crucible 10. A heating means 11 is operationally positioned about the lower portion of housing 5 so as to selectively provide heat to the lower portion of the reaction zone 9.

During operation, after the reaction zone 9 has been evacuated, the inert gas 6 is fed into zone 9 at a pressure P and maintained at a constant pressure by suitable means. The heating means 11 is energized to heat at least the lower portion of the reaction zone 9 above a temperature $T_P$ at which the vapor pressure of gaseous phosphorus is equal to the pressure P of the inert gas. Generally, this temperature ranges from about 300° to 600° C. With a quartz reaction housing as described, the heating means 11 is energized sufficiently to heat the lower portion of the reaction zone to about 430° C., which in accordance with FIG. 2 causes a gaseous phosphorus pressure of about 1 atm. A suitable heat-exchange medium, such as water, is circulated with the condenser 7 to maintain the temperature $T_L$ of the heat-exchange surface 7a above the melting point of yellow phosphorus at the pressure within the zone 9 but below the inversion temperature of liquid phosphorus into red phosphorus. This temperature ranges from about 44° to 250° C. Of course, the temperature of the heat-exchange surface 7a and thus the temperature of the upper portion of reaction zone 9 can be regulated as desired. A temperature $T_H$ within at least the lower portion of the reaction zone 9 causes material 8 to vaporize and provide a gaseous phosphorus atmosphere at a pressure at least equal to the inert gas pressure P. As the gaseous phosphorus contacts the cooler heat-exchange surface 7a, it condenses into liquid phosphorus droplets 12 which gravitates downwardly into the lower portion of reaction zone 9 and are revaporized so that a substantially constant gaseous phosphorus atmosphere is maintained within the lower portion of the reaction zone. The operating conditions are so regulated as to maintain a temperature relation of $T_H \doteq T_P$ so that the upper portion of the reaction zone 9 is composed of an inert gas 6 while the lower portion thereof is composed of gaseous phosphorus. Under such operating conditions, it has been ascertained that gaseous phosphorus does not rise above the condenser 7. The temperature $T_H$ does not have to be raised above the temperature $T_P$ (which regulates the pressure of gaseous phosphorus in relation to the pressure of the inert gas). However, if $T_H$ is above $T_P$, any excessive gaseous phosphorus is cooled and condenses on surface 7a for recycling to the lower portion of the reaction zone 9 so that a constant gaseous phosphorus pressure is maintained.

Figure 4:
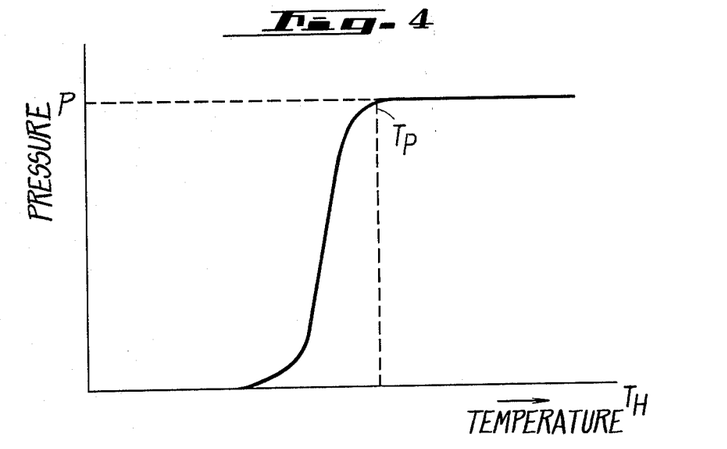
FIG. 4 is a graph showing the relationship between pressure and temperature explaining additional aspects of the invention.

As is apparent from FIG. 4, under operating conditions where the pressure P of the inert gas is held at a constant value, the partial pressure of phosphorus increases with an increase of the temperature $T_H$ of the reaction zone. However, at a temperature $T_P$ exceeding the temperature at which the vapor pressure of phosphorus is substantially equal to the pressure P (of the inert gas), any excess of vaporized phosphorus is condensed by the heat-exchange means into liquid phosphorus. Thus, the partial pressure of phosphorus within reaction zone 9 does not exceed the pressure P of the inert gas and equilibrium pressure conditions between the two gaseous atmospheres are maintained. Consequently, the vapor pressure of gaseous phosphorus within the reaction zone is easily controllable by adjusting the pressure P of the inert gas at the relation $T_H \doteq T_P$.

Referring back to FIG. 3, housing 5 is preferably constructed of two units so that its lower part can be disassembled from its upper part for insertion and removal of crucible 10. In a preferred form of the apparatus, the condenser 7 is formed of a metal which among other things, resists reaction with phosphorus, such as, for example, aluminum or titanium. Yellow phosphorus, liquid phosphorus and gaseous phosphorus are very active and metals such as gold, platinum, stainless steel, copper, etc. all react with such phosphorus, even at temperatures ranging up to 600° C. Under the operating conditions of the invention, titanium is relatively stable to phosphorus and aluminum is most stable. Further, the selected metal must not have any undesirable influences on the phosphides being synthesized, even if such metal does react with phosphorus to some small degree or becomes mixed into the phosphide crystals during the synthesis thereof. Considering all aspects of the characteristics required of a metal, a preferred metal is aluminum, which is a Group III element and can be combined with phosphorus, a Group V element, to form a III-V Group compound, which can be mixed without detrimental effects with a select phosphide being synthesized. For example, when gallium phosphide comprises the select phosphide and the condenser is formed of aluminum, a mixed crystal of aluminum phosphide and gallium phosphide is formed. This type of mixed crystal does not have any undesirable influences on the electrical characteristics of the resultant semiconductor.

Figure 5:
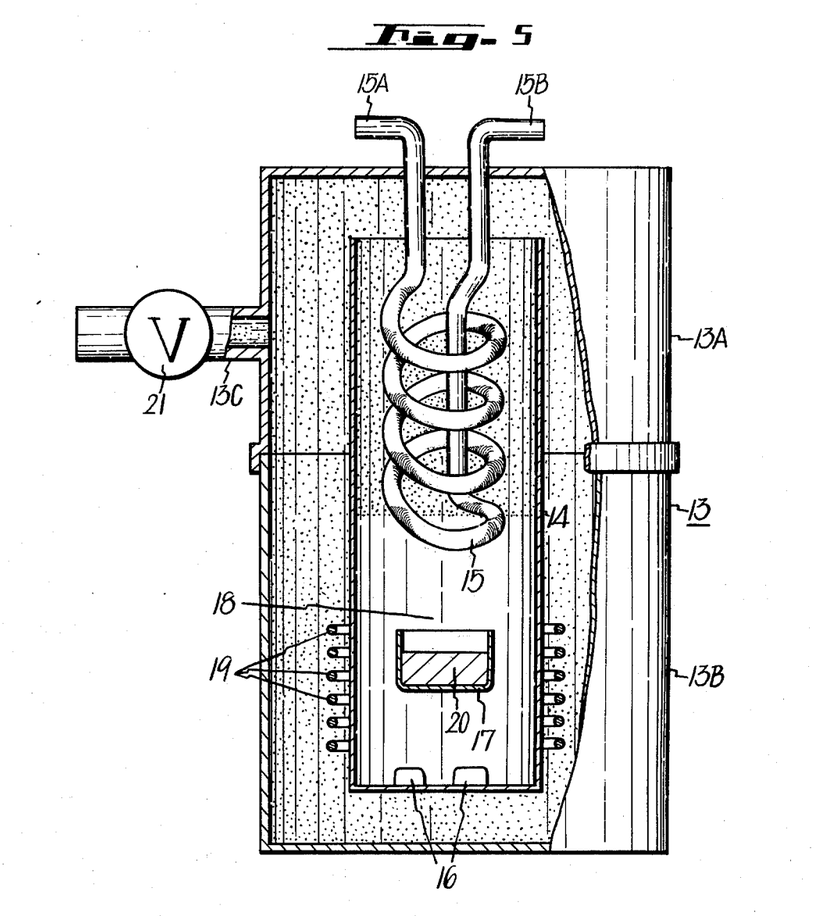
FIGS. 5 and 6 are cross-sectional views illustrating a modified form an an apparatus utilized in the practice of the invention.

The form of apparatus illustrated at FIG. 5 is especially adapted to practice the principles of the invention in connection with high pressure conditions. Such high pressure conditions are encountered when, for example, indium phosphide or the like is being synthesized. The decomposition pressure of indium phosphide is about 21 atm. at its melting point of about 1060° C. The apparatus comprises a high-pressure vessel 13, formed for example of stainless steel. The vessel 13 has a separable upper member 13A and a separable lower member 13B. A gas conduit 13C is in communication with a vacuum source and an inert gas supply (not shown). The control valve 21 selectively connects the interior of vessel 13 with either the vacuum source or the inert gas supply for first evacuating the vessel and then feeding an inert gas under a select high pressure therein. An open-top reaction housing 14 is positioned within the interior of vessel 13. The housing 14 is somewhat similar to the housing 5 of FIG. 3 and has disposed therein a suitable heat-exchange means 15, with conduits 15A and 15B providing communication with a supply of a heat-exchange medium outside the vessel 13. A gaseous phosphorus-source material 16, such as red phosphorus or liquid phosphorus in a stable phase is positioned within a lower portion of housing 14 and within the reaction zone 18 thereof. A crucible 17 is positioned within the reaction zone 18 and between the material 16 and the active surface of heat-exchange means 15. A heating means 19 is operationally arranged about the lower end of housing 14 so as to heat the reaction zone 18. A select phosphide-forming material 20 is placed in the crucible 17. During operation, at least the lower portion of reaction zone 18, i.e. the portion below the heat-exchange means, is maintained at a temperature $T_H$ (as explained above) and the temperature of the heat-exchange means is maintained at a temperature above the melting point of yellow phosphorus at the pressure conditions of the reaction and below the inversion temperature of liquid phosphorus into red phosphorus. The heat of the reaction chamber, as maintained by heating means 19, causes the material 16 to vaporize and provide a gaseous phosphorus within the reaction zone up to about the surface of the heat-exchange means as explained earlier. Further, the phosphide-forming material 20 is simultaneously sufficiently heated to make it reactive with gaseous phosphorus and synthesis of the select phosphide readily takes place. With this form of apparatus, the vessel 13 is not subjected to high temperatures or to a gaseous phosphorus atmosphere and need only be capable of withstanding high pressure. It will be noted that housing 14 is open at its upper end so that the pressure on its external and internal surfaces is equal and thus the housing 14 can be formed of a material which is not mechanically strong but can withstand high temperatures and a gaseous phosphorus atmosphere, for example, such as quartz. Of course, the heat-exchange means must be formed of a material having sufficient mechanical strength to withstand the pressure conditions of the reactions and either inert to or not detrimentally reactive with gaseous phosphorus.

Figure 6:
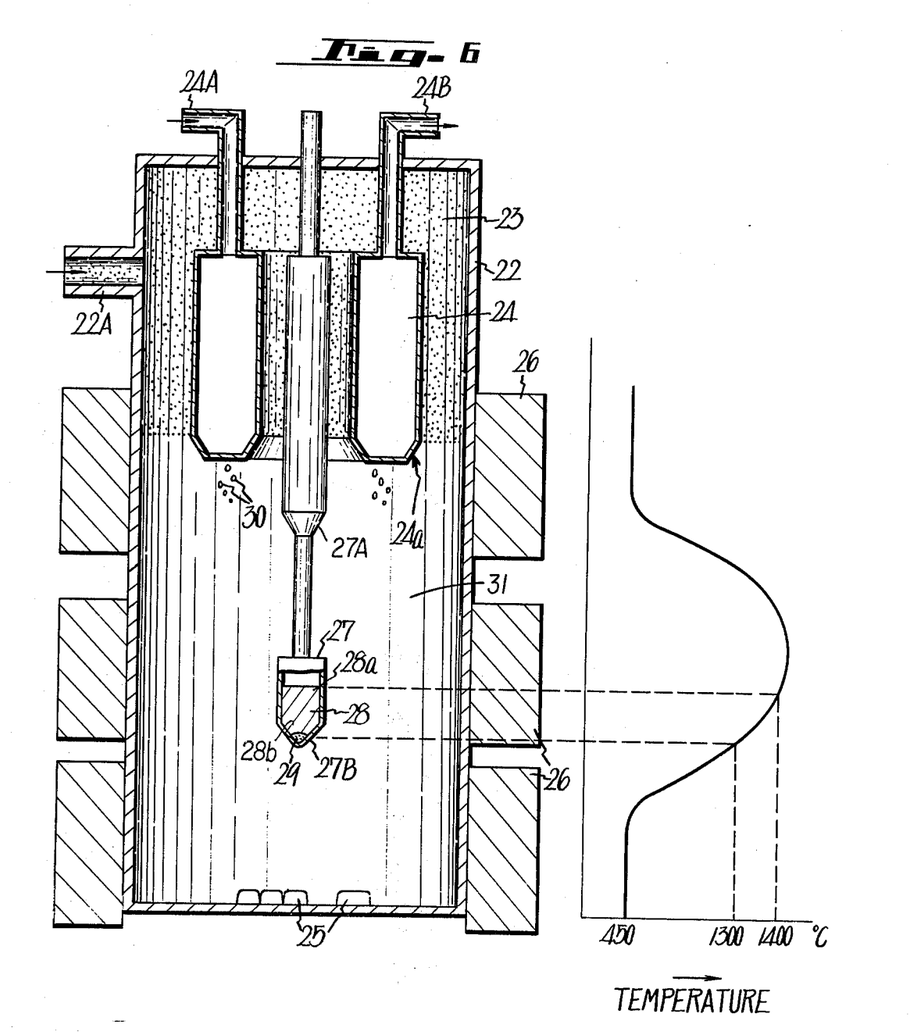
Figure 7:
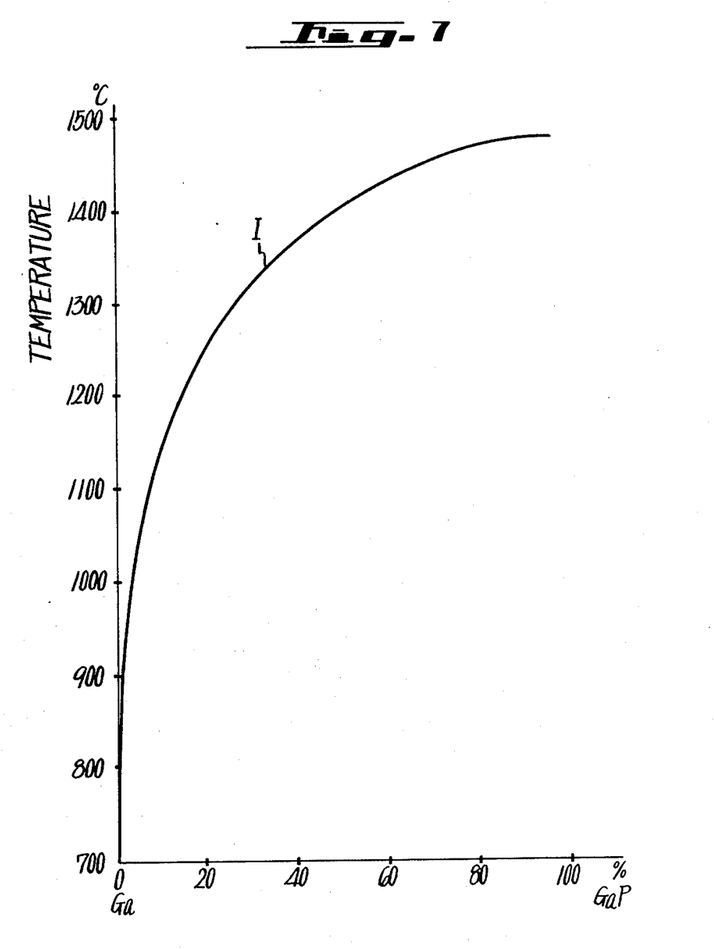
FIG. 7 is a graph illustrating the solubility of gallium phosphide in gallium in relation to temperature.

The form of apparatus illustrated at FIG. 6 is adapted for practicing the phosphide monocrystal synthesis embodiment earlier described. A suitable housing 22 is provided with a gas conduit 22A for evacuating the interior thereof and for introducing an inert gas 23 under a select pressure into the interior of housing 22. A suitable heat-exchange means, such as a condenser 24 having a central opening therethrough is provided within the upper portion of the interior of housing 22. A crucible support rod 27A extends through the top of housing 22 and through the opening in condenser 24 for positioning a crucible 27 at a select location within a reaction zone 31 of the housing 22. As shown, the crucible 27 is provided with a conically-shaped lower end 27B. A select phosphide-forming material 28 is placed within the crucible 27 and a gaseous phosphorus-source material 25 is placed along the bottom of reaction zone 31. A heating means 26 is operationally disposed around select portions of housing 22 so as to selectively control the temperature of select areas of the reaction zone 31. The area of the reaction zone 31 encompassing the crucible 27 is heated up so as to provide a temperature gradient along the length of the crucible, with the higher temperatures along the upper surface 28a and lower temperature toward the end 28b, as graphically illustrated on the right-hand side of FIG. 6. For example, when gallium phosphide is being synthesized, the temperature of the upper surface of gallium phosphide-forming material 28 is maintained at about 1400° C., which is below the melting point of the gallium phosphide being synthesized and the temperature of the lower portion of material 28, as at end 28b, is maintained at about 1300° C. Generally, the temperature gradient ranges from about 30° to 300° C. The pressure of the inert gas is adjusted so as to be at least equal to or above the decomposition pressure of, for example, gallium phosphide, at the temperature present at the upper surface 28a of the phosphide-forming material 28. Substantially simultaneously, the other areas of reaction zone 31 are heated up to a temperature at least above the temperature at which the pressure of gaseous phosphorus is equal to the decomposition pressure of, for example, gallium phosphide at a given temperature. With the above exemplary reaction conditions, the gallium phosphide mass, at least at its upper surface, is heated up to 1400° C. and the decomposition pressure of gallium phosphide at such temperature is about 1 atm. Accordingly, the reaction zone is heated up to about 430° to 450° C. so that gaseous phosphorus at a pressure of about 1 atm, is attained therein. Any excess phosphorus is condensed on surfaces 24A of the heat-exchange means and drips downwardly as liquid phosphorus droplets 30 to revaporize. When these temperature-pressure conditions are attained, gallium phosphide is synthesized at the surface 28a. As shown in FIG. 7, the solubility of gallium phosphide in molten gallium increases with increased temperatures. Thus, because of the vertical temperature gradient existing within crucible 27, gallium phosphide diffuses through the molten gallium, down to its lower temperature portion, as at end 27B and precipitates as a gallium phosphide monocrystal 29. The gaseous phosphorus atmosphere around crucible 27 is maintained at a constant pressure above the decomposition pressure of gallium phosphide and the phosphorus within the gallium phosphide being synthesized cannot dissociate and decompose such phosphide. The growth rate depends upon the diffusion rate of gallium phosphide through gallium, for example, when the surface temperature of gallium in the crucible is about 1400° C. and the temperature gradient is about 50° C/cm, a growth rate of 3.5 cm/day is attained and when the surface temperature is about 1200° C. with an identical temperature gradient, a growth rate of 0.7 cm/day is attained. Thus, relatively easy and highly reliable precipitation of phosphide monocrystals is achieved.

This form of apparatus can be modified similarly to that shown in FIG. 5 for high pressure operation if desired.

Figure 8:
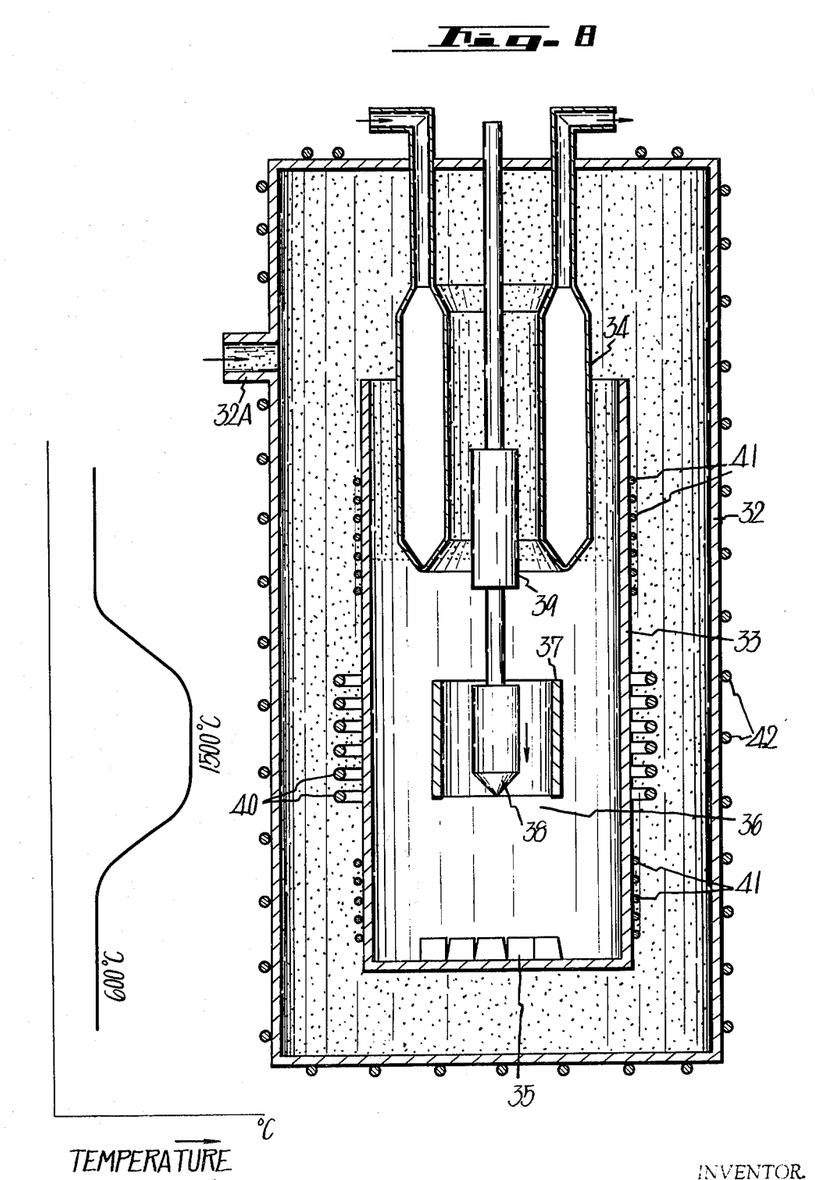
FIGS. 8 and 9 are schematic cross-sectional views showing further modified forms of an apparatus useful in the practice of the principles of the invention.

FIG. 8 illustrates another form of an apparatus useful in practicing the invention, especially in accordance with the Bridgeman technique. This form of apparatus includes an outer high-pressure vessel 32 having a gas conduit 32A, through which the interior vessel 32 is evacuated and filled with an inert gas at a select pressure. A reaction housing 33, such as composed of quartz or aluminum, is positioned within the interior of vessel 32. The housing 33 is open at its upper end and is provided with a suitable heat-exchange means 34, somewhat similar to the form described in FIG. 6. A movable crucible support means 39 extends into the interior of vessel 32 and partially into a reaction zone 36 of housing 33. A crucible 38, preferably cone-like in shape as shown, is attached to support means 39 for up and down movement therewith. A first heating means 37, such as composed of graphite, is mounted within the reaction zone 36 below the heat-exchange means 34. A second heating means, such as a high frequency coil 40 is positioned about housing 33 so as to surround the heating means 37. Additional heating means 41 are positioned along select areas of housing 33 so as to heat at least a lower portion of zone 36. The heating means allow the establishment of a temperature gradient within the reaction zone so that the maximum temperatures are attained in the area of the first heating means 37 and the temperature gradually lowers as the bottom of the reaction zone is approached. The pressure of the inert gas within vessel 32 and zone 36 is adjusted so as to be above the decomposition pressure of the phosphide being formed. The temperature of at least the lower portion of reaction zone 36 is regulated so as to be at least equal or above the temperature at which the pressure of gaseous phosphorus is equal to the pressure of the inert gas. In other words, the pressure of the inert gas and the highest temperature within the reaction zone are adjusted so as to exceed the melting point and the decomposition pressure of the phosphide being formed. Heat-exchange conduits 42 are positioned about the periphery of vessel 32 to keep its temperature at a selected value. Suitable gaseous phosphorus-source material 35 is positioned along the bottom of reaction zone 36 and a suitable phosphide-forming material is placed within crucible 38.

When, for example, gallium phosphide is being synthesized, a suitable gallium phosphide-forming material, such as gallium, is placed within crucible 38. Gallium phosphide has a decomposition pressure of 35 atm. at its melting point of 1470° C. Accordingly, the pressure of the inert gas is adjusted above 35 atm. Heating means 41 is activated to provide a temperature above 580° C. (i.e., the temperature at which the pressure of gaseous phosphorus is about equal to the pressure of inert gas) such as, for example, 600° C. within the reaction zone 36. Heating means 37 and 40 are activated to provide a temperature above the melting point of gallium phosphide, i.e. 1470° C., such as, for example, 1500° C. The heat-exchange means 34 regulates the temperature of the upper portion of the reaction zone and selectively maintains this temperature below about 250° C. so that equilibrium conditions exist within the reaction zone. As the phosphide-forming material within the crucible 38 melts and reacts with gaseous phosphorus to form, for example, gallium phosphide, support means 39 is moved downwardly so that the crucible passes to a lower temperature region within the reaction zone 36 and the molten phosphide cools and grows as a monocrystal at the bottom tip of crucible 38.

Similarly, indium phosphide is synthesized by placing a suitable indium phosphide-forming material within crucible 38 and attaining appropriate operating temperature-pressure conditions within the reaction zone. Indium phosphide has a decomposition pressure of 21 atm, at its melting point of 1060° C. Accordingly, the pressure of inert gas is adjusted above 21 atm. The heating means 37 and 40 are activated so as to provide a temperature above the melting point of indium phosphide, i.e. above 1060° C., such as for example, 1100° C. Heating means 41 is activated so as to provide a temperature above 560° C. (temperature at which the pressure of gaseous phosphorus is about equal to the decomposition pressure of indium phosphide and thus to the pressure of the inert gas), such as for example, 600° C. The heat-exchange means is activated to maintain the temperature of the upper portion of the reaction zone above the melting point of yellow phosphorus at the pressure conditions of the reaction and below the inversion temperature of liquid phosphorus into red phosphorus.

Figure 9:
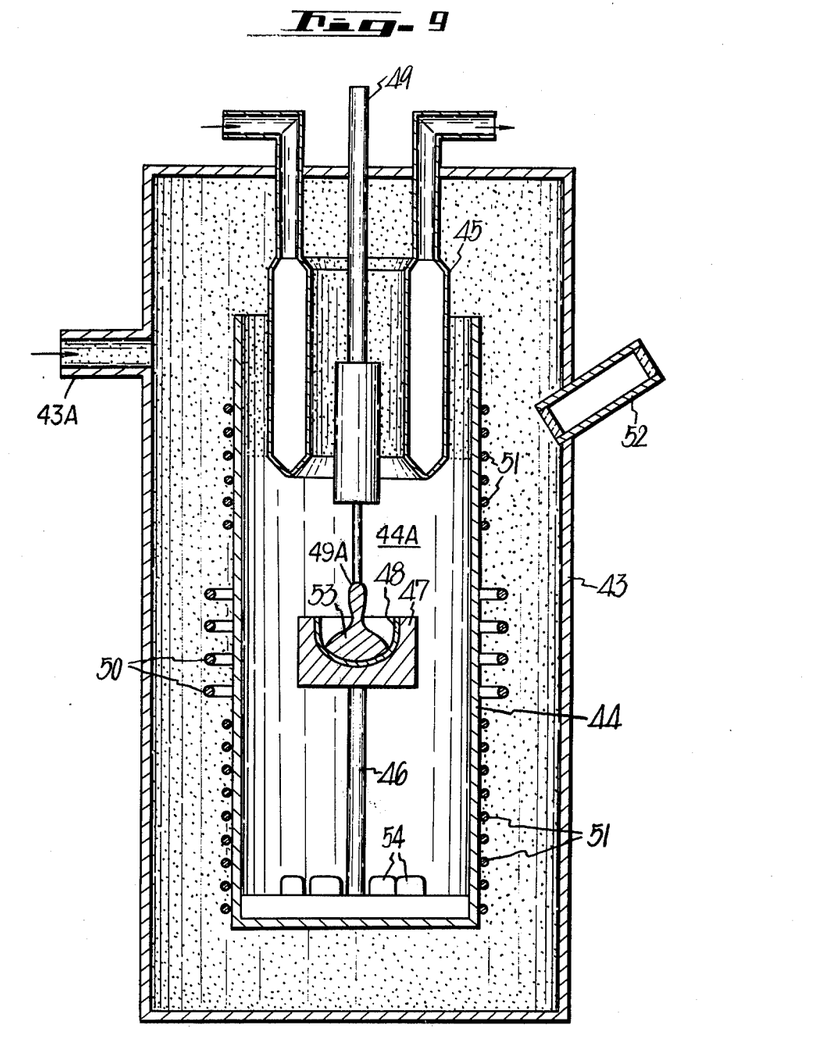

FIg. 9 illustrates a further form of an apparatus used in the practice of the invention, particularly with a crystal pulling technique. This form of apparatus includes an outer high-pressure vessel 43 provided with a suitable gas conduit 43A for evacuating the interior thereof and feeding an inert gas thereto. A reaction housing 44 is positioned with the interior of vessel 43 and its interior defines a reaction zone 44A. A suitable heat-exchange means 45 is positioned within the interior vessel 43 and extends into at least an upper portion of the reaction zone 44A. A crucible support means 46 is positioned within zone 44A so as to support a crucible 48 below the heat-exchange means 45. A gaseous phosphorus-source material 54 is placed along the bottom of zone 44A. Heating means 47, such as for example, composed of graphite, is mounted on the upper end of support means 46 and in direct contact with the exterior of crucible 48. A further heating means 40 is positioned about an area of housing 44 which encompasses the crucible 48. Additional heating means 51 are positioned about other portions of housing 44 so as to heat the reaction zone 44A. A suitable sight means 52 is mounted on vessel 43 to allow inspection of the operation as desired. A movable rod member 49 is mounted on top of vessel 43 for axial and rotational movement and the rod 49 extends downwardly sufficiently so at least a portion thereof penetrates the interior of crucible 48. A suitable phosphide-forming material 53 is placed within the crucible 48 and a suitable seed crystal 49A is attached to the lower portion of rod 49. The apparatus is then activated to achieve operating conditions.

For example, in pulling a monocrystal of gallium phosphide, the pressure of the inert gas is adjusted above 35 atm., the decomposition pressure of gallium phosphide at its melting point of 1470° C. The heating means 51 is activated to provide a temperature above about 580° C. (the temperature at which the pressure of gaseous phosphorus is about equal to the pressure of inert gas) and the heating means 47 and 50 are activated to raise the temperature of the crucible slightly above the melting point of gallium phosphide, i.e. above 1470° C. When the material 53 is molten, the rod 49 is activated so that at least the seed crystal 49A is lowered into the molten material. After a sufficient quantity of gallium phosphide is formed, the rod is slowly pulled upwardly, while being rotated at a predetermined speed so as to pull a monocrystal of gallium phosphide from the molten mass. Similarly, other select phosphide monocrystals are readily produced. The pulling axial speed is in the range of about 0.7 to 3 cm/hour and the rate of revolution of the rod is in the range of about 3 to 60 revolutions per minute.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendant claims.

We claim as our invention:

1. A process of producing a phosphide comprising:

positioning a suitable gaseous phosphorus-source material along a first lower portion of a reaction zone and positioning a select phosphide-forming material within a second lower portion of said reaction zone and below an upper portion of said reaction zone;

feeding an inert gas into said reaction zone and maintaining said inert gas within said reaction zone at a pressure at least equal to the decomposition pressure of the phosphide being produced at a given temperature;

cooling said upper portion of the reaction zone to a temperature below the inversion temperature of liquid phosphorus into red phosphorus and above the melting point of yellow phosphorus at the pressure within said reaction zone so that any gaseous phosphorus coming in contact with the cooled upper portion of the reaction zone is converted to liquid phosphorus;

heating said first lower portion of the reaction zone to a temperature sufficient to vaporize at least a portion of said gaseous phosphorus-source material into gaseous phosphorus at a pressure greater than the pressure of the inert gas at said lower portions of said reaction zone but below the pressure of the inert gas at the upper portion of the reaction zone so as to establish equilibrium pressure conditions within said reaction zone wherein at least a top portion of said upper portion of the reaction zone is composed of said inert gas and at least a top portion of said lower portions of the reaction zone are composed of gaseous phosphorus;

heating said second lower portion of the reaction zone to a temperature sufficient to initiate a reaction between said phosphide-forming material and gaseous phosphorus; and maintaining siad pressure-temperature conditions within said reaction zone for a period of time sufficient to produce said phosphide.

2. A process as defined in claim 1 wherein the phosphide-forming material is selected from the group consisting of a Group III element and a mixture of a Group III element and a phosphide.

3. A process as defined in claim 1 wherein the phosphide-forming material is selected from the group consisting of gallium, indium, aluminum and mixtures thereof.

4. A process as defined in claim 1 wherein the gaseous phosphorus-source material is selected from the group consisting of red phosphorus and liquid phosphorus in a stable state.

5. A process as defined in claim 1 wherein the phosphide-forming material is heated at least sufficiently to form a molten mass thereof.

6. A process as defined in claim 5 wherein the phosphide-forming material is heated at least up to the melting point of the phosphide being produced and a suitable seed crystal is immersed into the molten mass of phosphide-forming material and pulled from said molten mass at controlled rates so that a monocrystal of the phosphide being produced is formed on said seed crystal.

7. A process as defined in claim 5 wherein at least an upper portion of the phosphide-forming material is heated above the melting point thereof and below the melting point of the phosphide being produced and a lower portion of the phosphide-forming material is heated up to its melting point and below the temperature of the upper portion thereof.

8. A process as defined in claim wherein the difference in temperature between the upper portion of the phosphide-forming material and the lower portion thereof is in the range of about 30° to 300° C.

9. A process as defined in claim 1 wherein the upper portion of the reaction zone is cooled to a temperature in the range of about 44° to 250° C.

10. A process of producing gallium phosphide comprising:
positioning a suitable gaseous phosphorus-source material along the first lower portion of an enclosed reaction zone and positioning the gallium phosphide-forming material within an intermediate portion of said reaction zone and below an upper portion of said reaction zone;
feeding an inert gas into said reaction zone and maintaining said inert gas within said reaction zone at a pressure at least equal to 35 atm.;
cooling said upper portion of the reaction zone to a temperature below the inversion temperature of liquid phosphorus into red phosphorus and above the melting point of yellow phosphorus at the pressure within said reaction zone so that any gaseous phosphorus coming in contact with the cooled upper portion of the reaction zone is converted to liquid phosphorus;
heating said first lower portion of the reaction zone to a temperature equal to at least 580° C. so as to provide a gaseous phosphorus at a pressure greater than the pressure of the inert gas at the lower portions of said reaction zone but below the pressure of the inert gas at the upper portion of the reaction zone and to establish equilibrium pressure conditions within said reaction zone wherein at least a top portion of said upper portion of the reaction zone is composed of said inert gas and at least a top portion of said lower portions of the reaction zone are composed of gaseous phosphorus;
heating said second lower portion of the reaction zone to a temperature at least equal to 1470° C. so as to initiate a reaction between said gallium phosphide-forming material and gaseous phosphorus; and
maintaining said pressure-temperature conditions within said reaction zone for a period of time sufficient to produce gallium phosphide.

11. A process of producing indium phosphide comprising:
positioning a suitable gaseous phosphorus-source material along the first lower portion of a reaction zone and positioning an indium phosphide-forming material within an intermediate portion of said reaction zone and below an upper portion of said reaction zone;
feeding an inert gas into said reaction zone and maintaining said inert gas within said reaction zone at a pressure at least equal to 21 atm.;
cooling said upper portion of the reaction zone to a temperature below the inversion temperature of liquid phosphorus into red phosphorus and above the melting point of yellow phosphorus at the pressure within said reaction zone so that any gaseous phosphorus coming in contact with the cooled upper portion of the reaction zone is converted to liquid phosphorus;
heating said first lower portion of the reaction zone to a temperature at least equal to 560° C. so as to provide gaseous phosphorus at a pressure greater than the pressure of the inert gas at the lower portions of said reaction zone but below the pressure of the inert gas at the upper portion of the reaction zone and to establish equilibrium pressure conditions within said reaction zone wherein at least a top portion of said upper portion of the reaction zone is composed of said inert gas and at least a top portion of said lower portions of the reaction zone are composed of gaseous phosphorus;
heating said second lower portion of the reaction zone to a temperature equal to at least 1060° C. so as to initiate a reaction between said indium phosphide-forming material and gaseous phosphorus; and
maintaining said pressure-temperature conditions within said reaction zone for a period of time sufficient to produce said phosphide.

12. A process of producing a phosphide semiconductor material comprising:
positioning a gaseous phosphorus-source material selected from the group consisting of red phosphorus and liquid phosphorus in a stable phase within a first lower portion of a reaction zone and positioning a phosphite-forming material selected from the group consisting of a Group III element in a mixture of a Group III and a phosphide within said second lower portion of said reaction zone and below an upper portion of said reaction zone;
evacuating said reaction zone of ambient atmosphere and feeding an inert gas into said reaction zone and maintaining said inert gas within said reaction zone at a pressure at least equal to the decomposition pressure of the phosphide semiconductor material being produced at a given temperature;

cooling said upper portion of the reaction zone to a temperature below the inversion temperature of liquid phosphorus into red phosphorus and above the melting point of yellow phosphorus at the pressure within said reaction zone so that any gaseous phosphorus coming in contact with the cooled upper portion of the reaction zone is converted to liquid phosphorus;

heating said first lower portion of the reaction zone to a temperature sufficient to vaporize at least a portion of said gaseous phosphorus-source material into gaseous phosphorus at a pressure greater than the pressure of the inert gas at the lower portions of said reaction zone but below the pressure of the inert gas at the upper portion of the reaction zone so as to establish equilibrium pressure conditions within said reaction zone wherein at least a top portion of said upper portion of the reaction zone is composed of said inert gas and at least a top portion of said lower portions of the reaction zone are composed of gaseous phosphorus;

heating said second lower portion of the reaction zone to a temperature sufficient to initiate a reaction between said phosphide-forming material and gaseous phosphorus; and maintaining said pressure-temperature conditions within said reaction zone for a period of time sufficient to produce said phosphide.

* * * * *